United States Patent
Chen et al.

(10) Patent No.: US 11,743,936 B2
(45) Date of Patent: Aug. 29, 2023

(54) RANDOM ACCESS PROCEDURES IN NEW RADIO UNLICENSED SPECTRUM (NR- U)

(71) Applicant: Apple Inc., Cupertino, CA (US)

(72) Inventors: Yuqin Chen, Shenzhen (CN); Dawei Zhang, Saratoga, CA (US); Fangli Xu, Beijing (CN); Haijing Hu, Beijing (CN); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/553,333

(22) Filed: Aug. 28, 2019

(65) Prior Publication Data

US 2020/0137793 A1 Apr. 30, 2020

Related U.S. Application Data

(60) Provisional application No. 62/751,993, filed on Oct. 29, 2018.

(51) Int. Cl.
| | |
|---|---|
| *H04W 74/00* | (2009.01) |
| *H04W 28/26* | (2009.01) |
| *H04W 74/08* | (2009.01) |
| *H04W 72/0446* | (2023.01) |
| *H04W 72/23* | (2023.01) |

(52) U.S. Cl.
CPC ......... *H04W 74/006* (2013.01); *H04W 28/26* (2013.01); *H04W 72/0446* (2013.01); *H04W 72/23* (2023.01); *H04W 74/0833* (2013.01)

(58) Field of Classification Search
CPC ........... H04W 74/006; H04W 74/0833; H04W 72/0446; H04W 28/26; H04W 72/042
See application file for complete search history.

(56) References Cited

U.S. PATENT DOCUMENTS

| | | | |
|---|---|---|---|
| 9,131,492 B2 * | 9/2015 | Nam | H04W 72/23 |
| 10,111,249 B2 | 10/2018 | Wong | |
| 2013/0301554 A1 * | 11/2013 | Nam | H04W 72/23 |
| | | | 370/329 |
| 2014/0314009 A1 * | 10/2014 | Xiong | H04W 76/14 |
| | | | 370/329 |

(Continued)

OTHER PUBLICATIONS

Lagen et al. "New Radio beam-based Access to Unlicensed Spectrum: Design Challenges and Solutions" arXiv preprint arXiv:1809.10443, 18 pages, (2018).

*Primary Examiner* — Harry H Kim
(74) *Attorney, Agent, or Firm* — Kowert, Hood, Munyon, Rankin & Goetzel, P.C.

(57) ABSTRACT

A network, e.g. a New Radio network operating in the unlicensed spectrum, may reserve resources for the purpose of UE(s) performing a random access procedure (RACH) on the network. The network may indicate the resource reservation to the UE(s) in information transmitted to the UE(s) via signaling. The UE(s) may receive the information indicative of the resource reservation and may subsequently perform a RACH using the reserved resources indicated in the information received by the UE(s). The information or at least a portion of the information may be received in an initial signal, in a slot format indicator as part of downlink control information (DCI), in a wideband demodulation reference signal, in a radio network temporary identifier, and/or in radio resource control signaling.

18 Claims, 8 Drawing Sheets

(56) References Cited

U.S. PATENT DOCUMENTS

| | | | |
|---|---|---|---|
| 2015/0049704 A1* | 2/2015 | Park | H04L 5/0094 |
| | | | 370/329 |
| 2015/0326484 A1* | 11/2015 | Cao | H04W 74/08 |
| | | | 370/329 |
| 2016/0057783 A1 | 2/2016 | Rosa et al. | |
| 2017/0202022 A1* | 7/2017 | Chendamarai Kannan | |
| | | | H04W 74/0816 |
| 2018/0192397 A1* | 7/2018 | Seo | H04L 27/0006 |
| 2018/0338271 A1 | 11/2018 | Park et al. | |
| 2018/0376510 A1* | 12/2018 | Sun | H04W 72/23 |
| 2019/0044679 A1* | 2/2019 | Manolakos | H04L 5/0051 |
| 2019/0110314 A1* | 4/2019 | Abedini | H04W 72/23 |
| 2019/0305899 A1* | 10/2019 | Rico Alvarino | H04L 1/203 |
| 2019/0349998 A1* | 11/2019 | Bhattad | H04W 72/1268 |
| 2020/0045738 A1* | 2/2020 | Oh | H04W 16/14 |
| 2020/0059935 A1* | 2/2020 | Qian | H04W 72/042 |
| 2020/0059962 A1* | 2/2020 | Tejedor | H04W 74/0808 |
| 2020/0106591 A1* | 4/2020 | Chen | H04L 5/0051 |
| 2020/0107322 A1* | 4/2020 | Lunttila | H04W 74/0833 |
| 2020/0359426 A1* | 11/2020 | Pan | H04W 74/0808 |
| 2020/0383147 A1* | 12/2020 | Yoon | H04L 27/2607 |
| 2021/0037554 A1* | 2/2021 | Kim | H04L 5/0051 |
| 2021/0185734 A1* | 6/2021 | Li | H04W 74/0808 |
| 2021/0307061 A1* | 9/2021 | Huang | H04W 74/0808 |

\* cited by examiner

RANDOM ACCESS PROCEDURES IN NEW RADIO UNLICENSED SPECTRUM (NR- U)

PRIORITY CLAIM

This application claims benefit of priority of U.S. Provisional Patent Application Ser. No. 62/751,993 titled "Random Access Procedures in New Radio Unlicensed Spectrum (NR-U)", filed on Oct. 29, 2018, which is hereby incorporated by reference as though fully and completely set forth herein.

FIELD OF THE INVENTION

The present application relates to wireless communications, and more particularly to providing random access procedures for New Radio communications in the unlicensed spectrum (NR-U).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

When switched on, a UE typically begins searching for a network. There is a possibility that there are many networks or many frequencies from different network operators to which the UE may connect. Therefore, the UE needs to synchronize to each frequency and determine to which of those frequencies the UE will connect. The UE performs this by undergoing an initial synchronization process. Once the UE has completed the synchronization process, it begins to use system information to establish wireless communications with(in) the network. LTE system information includes the Master Information Block (MIB) and a number of System Information Blocks (SIBs). The MIB is broadcast on the Physical Broadcast Channel (PBCH), while SIBs are sent on the Physical Downlink Shared Channel (PDSCH) through Radio Resource Control (RRC) messages (i.e. via RRC messaging/signaling). An SI message can contain one or several SIBs.

The MIB is the initial system information used by the UE once the UE has achieved downlink synchronization, and carries the most essential information that is needed for the UE to acquire other information from the cell. The various different SIBs (e.g., LTE includes five different types of SIBs, SIB1-SIB5) carry the remaining information needed by the UE to conduct wireless communications in the cell. LTE system information (SI) is transmitted in the broadcast control logical channel (BCCH). Generally, BCCH messages are carried on the Downlink Shared Channel (DL-SCH) and transmitted on the Physical Downlink Shared Channel (PDSCH) in conjunction with a downlink control information (DCI) message transmitted on the Physical Downlink Control Channel (PDCCH) that indicates format and resource allocation of the PDSCH transmission. SI-RNTI, the Radio Network Temporary Identity (RNTI) of the system information, scrambles this DCI message. The exception is the initial system information conveyed in the master information block (MIB), which, as mentioned above, is carried on the BCH transport channel and transmitted on the PBCH.

Once the SIBs (at least SIB1) have been read, the UE performs a random access procedure (RACH) to initiate data transfer with(in) the network. At this stage, there may be many other UEs in the same area (e.g. in the same cell) performing similar procedures, in which case there is a possibility of collision among the requests coming from various other UEs. Such a RACH is referred to as a contention-based RACH. However, a network can inform a UE to use a unique identity to prevent its request from colliding with requests coming from other UEs. Such a RACH is referred to as contention-free RACH or non-contention-based RACH. A contention-free RACH is performed for an intra-system handover request, or a synchronization request for downlink data transfer (upon losing synchronization during downlink data transfer). A contention-based RACH is performed for moving from a radio resource control (RRC) Idle state to an RRC connected state, a synchronization request for uplink data transfer (upon losing synchronization during uplink data transfer), or an RRC connection reestablishment request. The overall functionality and structure of the MIB/SIB in NR is almost the same as it is in LTE, with some differences.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, NR, Wi-Fi, BLUETOOTH™, etc.). There are ongoing efforts not only to reduce power consumption required to perform wireless communications in order to improve the battery life of wireless devices, but also to achieve efficient use of wireless communication resources and thereby increase system efficiency. However, increasing the functionality of a UE, for example adding functionality for NR and/or NR Unlicensed Spectrum (NR-U) deployment, can significantly affect system and device operations including RACH procedures performed by UEs operating in the unlicensed spectrum. It is therefore desirable to provide appropriate support for RACH procedures in NR and/or NR-U deployment of UEs.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, for reserving/obtaining network resources for performing a random access procedure (RACH), e.g. when operating in New Radio Unlicensed (NR-U) spectrum. Embodiments are further presented herein for wireless communication systems containing wireless communication devices (UEs) and/or base stations and access points (APs) communicating with each other within the wireless communication systems.

In some embodiments, a device, e.g. a wireless communication device or UE, may wirelessly communicate on a network, and may receive, from the network, information indicative of network resources reserved by the network for the purpose of the device performing a random access procedure (RACH). The device may then perform a RACH according to the received information, using the network resources reserved by the network. The information received by the device may include cell identification that identifies a cell associated with the network resources reserved by the network, a time indication that identifies how long the cell occupies the network resources reserved by the network, e.g. channel occupancy time (CoT) information, and/or a device group identification that indicates which devices are to use the network resources reserved by the network.

The device may receive the information before the device begins transmitting during a next uplink time period following a receive/transmit switching delay, e.g. following a delay between the device receiving data and beginning to transmit data. The device may receive at least a portion of the information from the network in an initial signal transmitted subsequent to a successful listen-before-talk procedure performed by the network. The initial signal may include a preamble that allows coherent detection by the device, with the preamble preceding the information within the initial signal. In some embodiments, the initial signal may include a first portion of the information subsequent to the preamble, and the device may receive a second portion of the information via additional signaling, e.g. radio resource control (RRC) signaling. The device may also receive the information in a slot format indicator, e.g. the information may include channel occupancy time information indicated by a slot pattern indicated by the slot format indicator. In some embodiments, the information may include a device group identifier indicated in a slot format indicator radio network temporary identifier, and the slot format indicator may be included in downlink control information.

In some embodiments, the device may receive the information in a wideband demodulation reference signal and in downlink control information. The wideband demodulation reference signal may include cell identification that identifies a cell associated with the network resources reserved by the network, and the downlink control information may include a time indication that identifies how long the cell occupies the network resources reserved by the network, and/or a device group identification that indicates which devices are to use the network resources reserved by the network.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
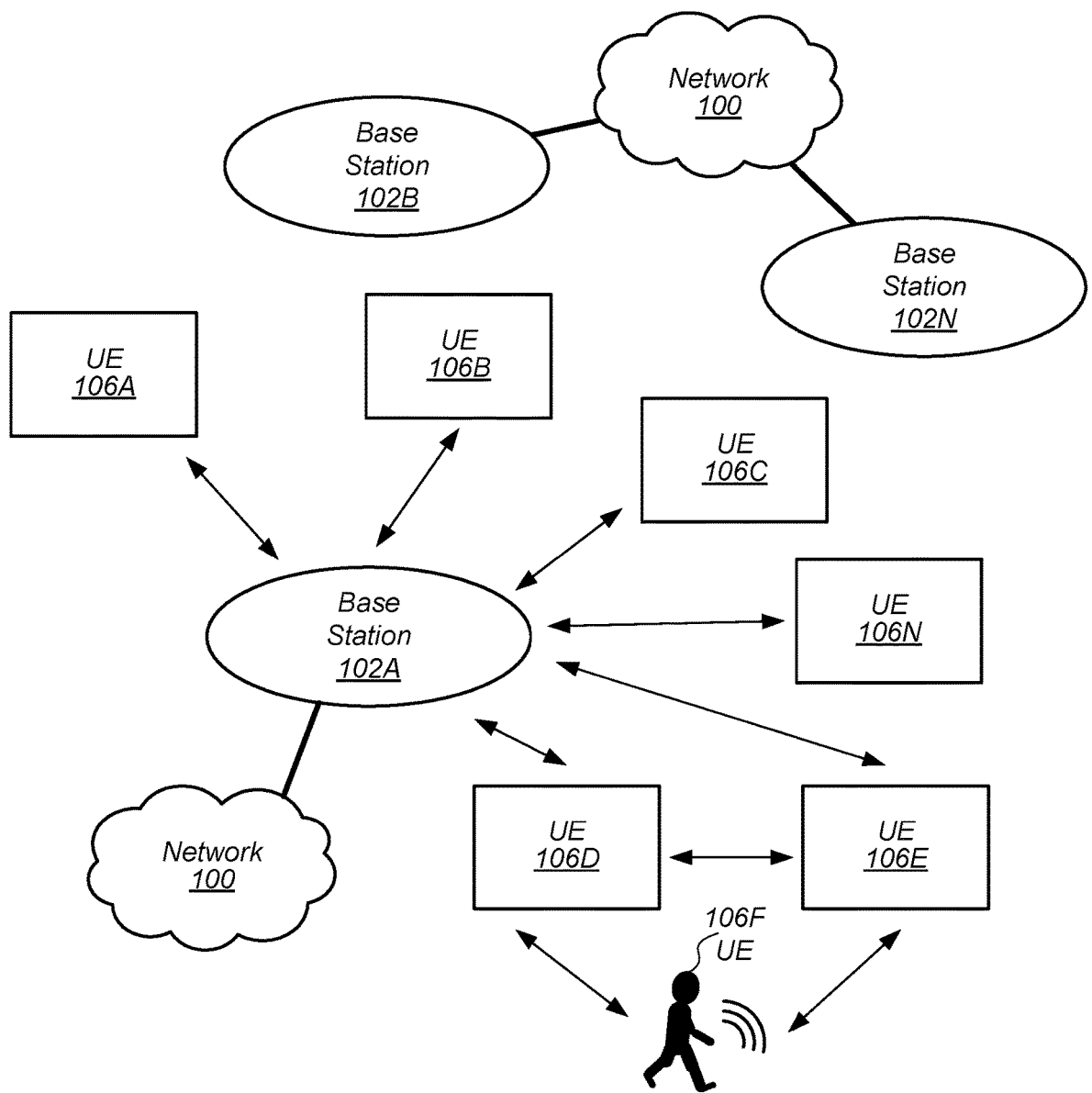
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
BS: Base Station
BSR: Buffer Size Report
BSSID: Basic Service Set Identifier
CBRS: Citizens Broadband Radio Service
CBRSD: Citizens Broadband Radio Service Device
CCA: Clear Channel Assessment
CMR: Change Mode Request
CS: Circuit Switched
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAT: Radio Access Technology
RF: Radio Frequency
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony Play Station™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
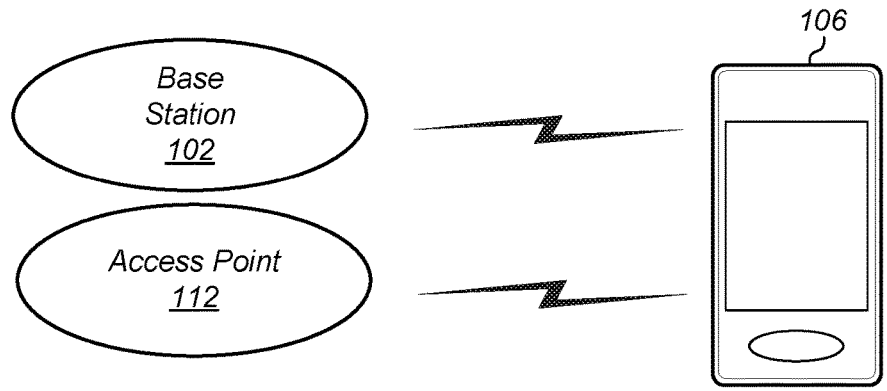
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may operate to perform a random access procedure (RACH) using network resources that have been reserved for the purpose of performing a RACH, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station is implemented in the context of LTE, it may alternately be referred to as an 'eNodeB' or 'eNB', and if it is implemented in the context of 5G NR, it may alternately be referred to as 'gNodeB' or 'gNB'. In some embodiments, base station 102A (e.g. an eNB in an LTE network or a gNB in an NR network) may operate to reserve resources for UEs to perform a RACH on the network serviced by base station 102A, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station(s) 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UEs 106 to conduct communications with the UEs 106 and in some cases affect at least some of the communication parameters and/or use of communication resources of the UEs 106.

Furthermore, as also illustrated in FIG. 1, at least some of the UEs 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Various aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
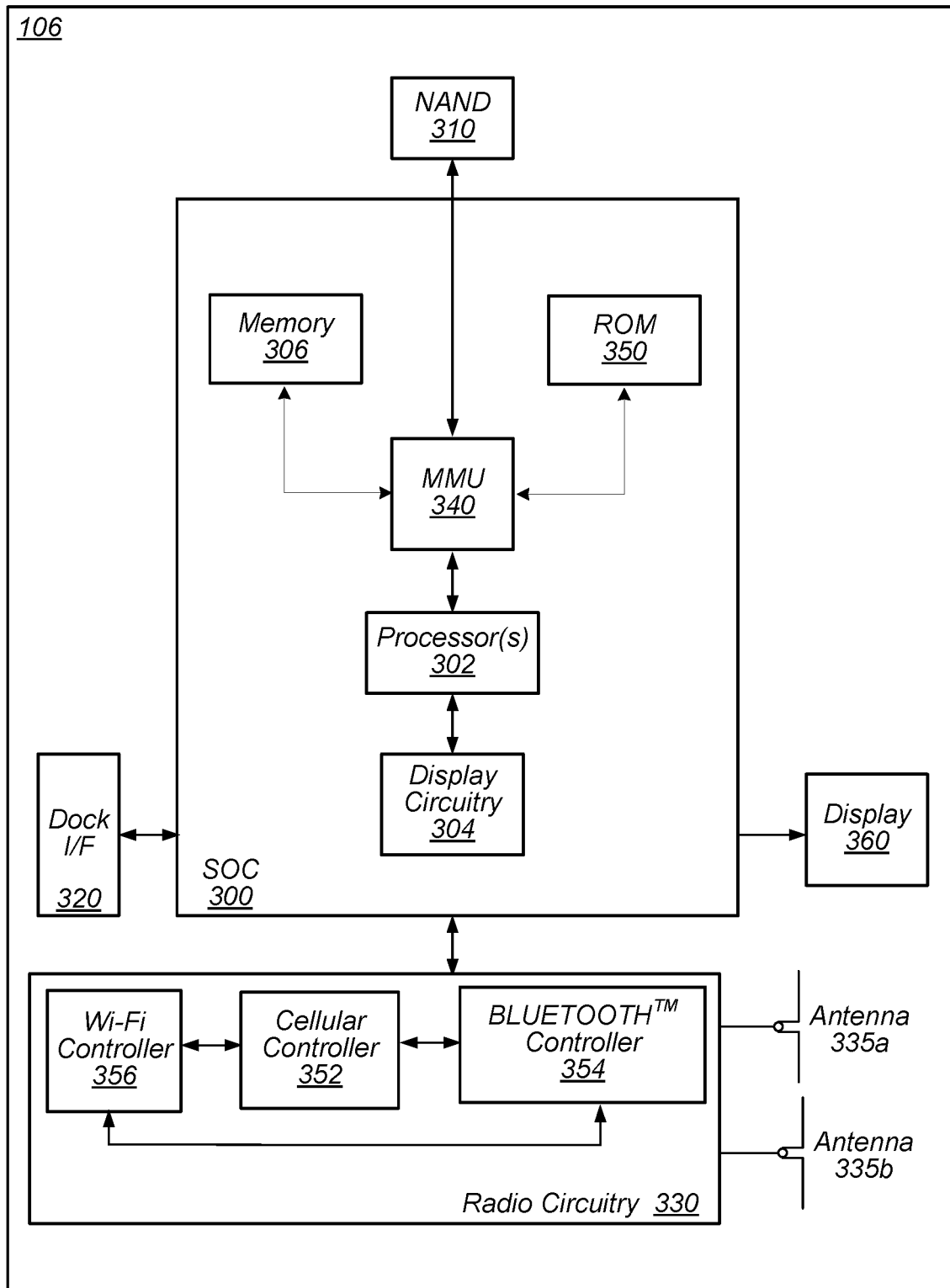
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to perform a random access procedure (RACH) using network resources that have previously been reserved for the UE to perform a RACH as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform a RACH using network resources that have previously been reserved for the purpose of the UE performing a RACH according to various embodiments disclosed herein. Processor(s) 302 may also implement various other applications and/or end-user applications running on UE 106.

Figure 5:
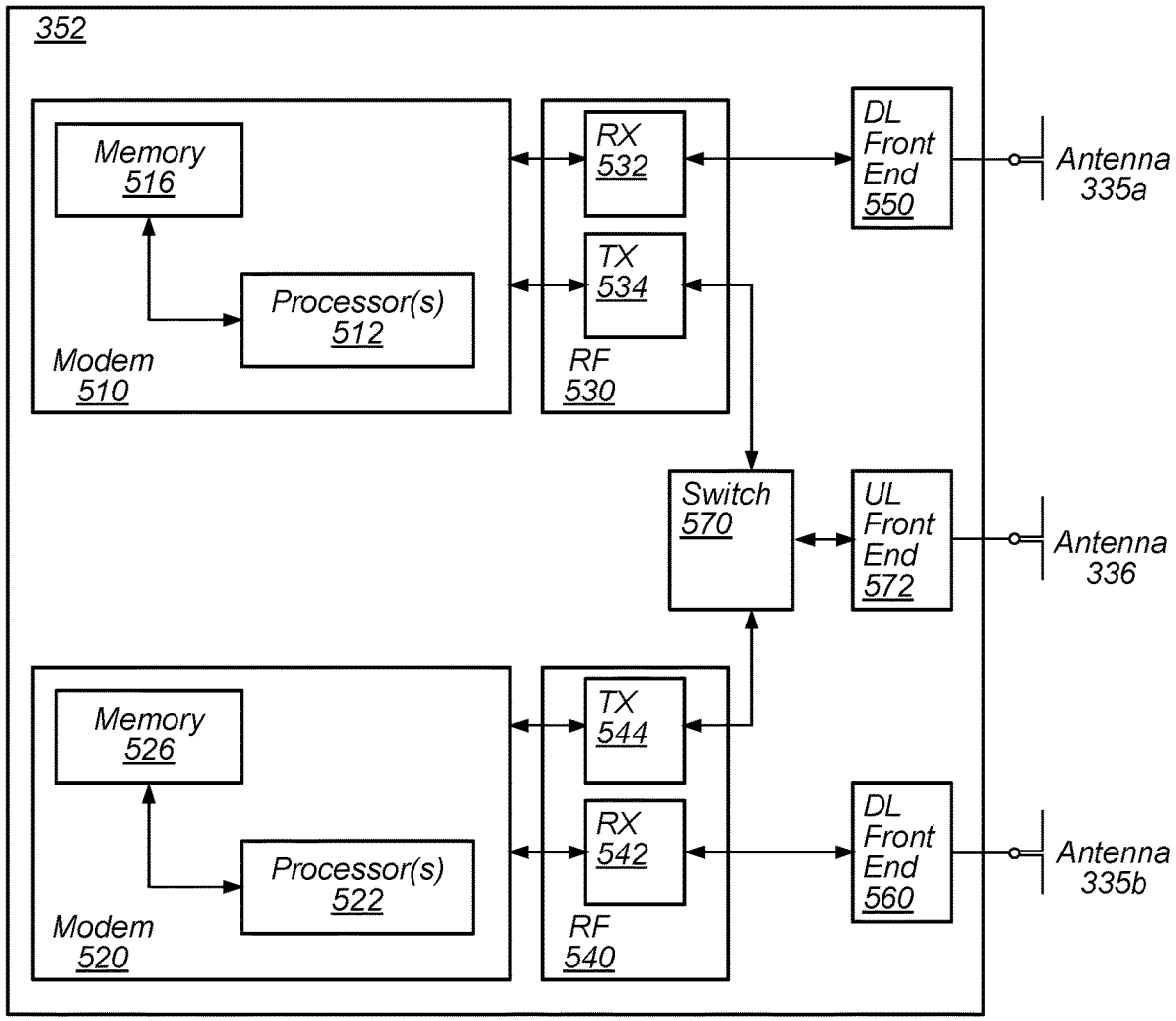
FIG. 5 shows an exemplary, simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
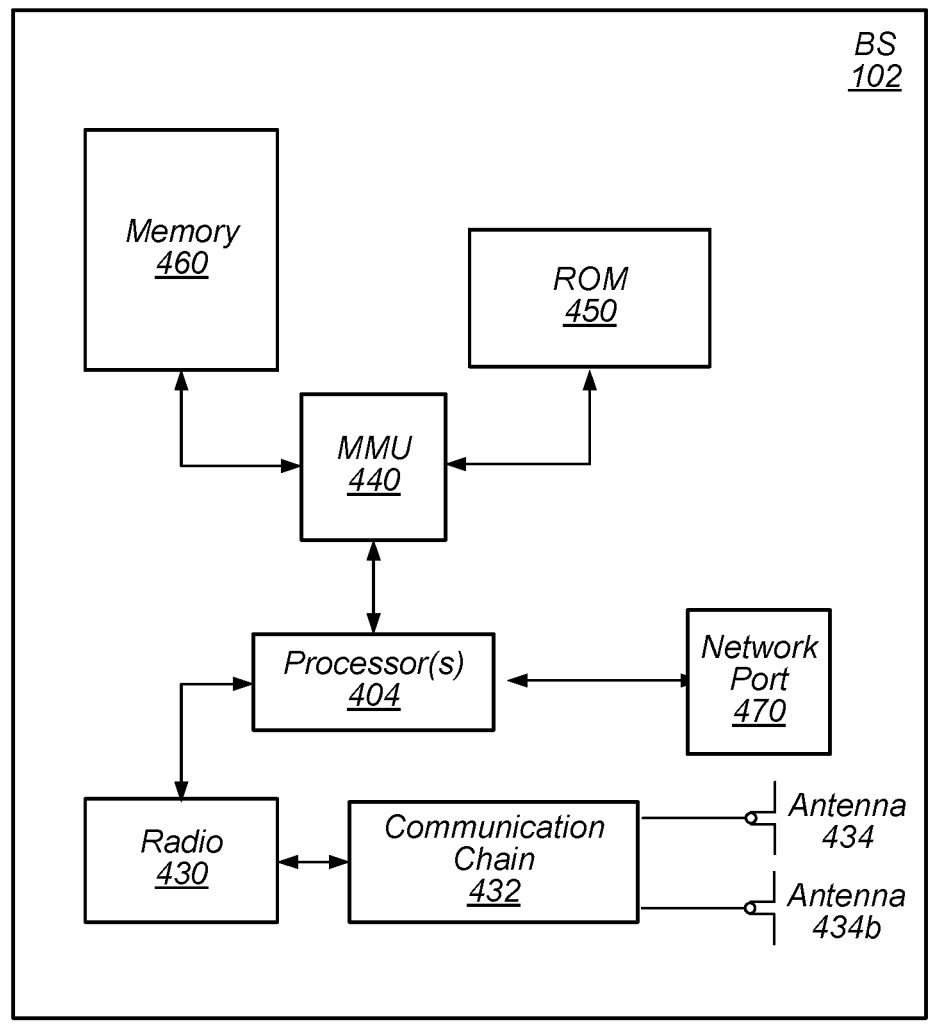
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. Antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device and reserve network resources for the purpose of the UE device performing a RACH. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for reserving network resources for one or more UEs to perform a RACH.

FIG. 5—Block Diagram of Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Listen-Before-Talk (LBT) Failure Issue for RACH

As previously mentioned, in addition to the major communication standards such as LTE and NR, there are also extensions aimed at boosting transmission coverage in certain cellular networks. For example, LTE in unlicensed spectrum (LTE-U) and NR in unlicensed spectrum (NR-U) allow cellphone carriers to boost coverage in their cellular networks by transmitting in the unlicensed 5 GHz band, which is also used by many Wi-Fi devices. Licensed Assisted Access (LAA) describes a similar technology aimed at standardizing operation of LTE and NR in the Wi-Fi bands through the use of a contention protocol referred to as listen-before-talk (LBT), which facilitates coexistence with other Wi-Fi devices on the same band. In order to make devices more versatile, support for standalone NR-U deployment of UEs has been proposed. Based on UE capability, UEs may be divided into two categories, a first category indicative of UEs supporting standalone NR-U operation and a second category indicative of UEs not supporting standalone NR-U operation. In other words, a UE may or may not be capable of camping on an NR-U cell, that is, the UE may or may not be capable of remaining connected to or communicating on the NR-U cell.

UEs capable of camping (remaining connected) on an NR-U cell or network are expected to perform certain procedures, including LBT procedures and RACHs to successfully connect to the NR-U network. However, if a UE does not perform an LBT procedure prior to a RACH, the network (e.g. NR-U network) system may severely interfere with other systems (e.g. Wi-Fi systems). On the other hand, if the UE performs the LBT procedure before the RACH, most UE(s) will not pass the LBT check when some of the UE(s) start transmitting on the physical random access channel (PRACH) which is used to carry random access preambles used for initiation of RACHs. The main reason for this is that UE(s) need to perform a random back off procedure for collision resolution to mitigate the congestion in the PRACH before transmission, which results in the actual transmission time differing among UE(s). Consequently, most UE(s) would consider the medium to be busy (during the back off duration) if some other UE(s) have already triggered a transmission.

Reserving Resources for RACH

In order to enable UEs to perform a RACH while mitigating the issues stemming from LBT failure, in some embodiments, the network (e.g. a gNB/base station) may reserve the wireless medium for RACH, and indicate the reservation to the UE. The entire duration of the downlink (DL) signal, receive/transmit (RX/TX) switching time, and RACH resource may be within the MCoT (maximum channel occupancy time). In order to allow the UE to detect/determine that a RACH resource period has been reserved for the UE by its serving cell, the following information may be used:

- An indication, e.g. via a signal, of the "Cell ID", e.g., an indication of whether this is the serving cell; and
- An indication, e.g. via a signal, of the channel occupancy time (CoT), e.g., whether the RACH resource is within the reserved time period (or duration). In some embodiments, the CoT may be indicated via RRC signaling or physical signaling, e.g. via DCI.

Figure 6:
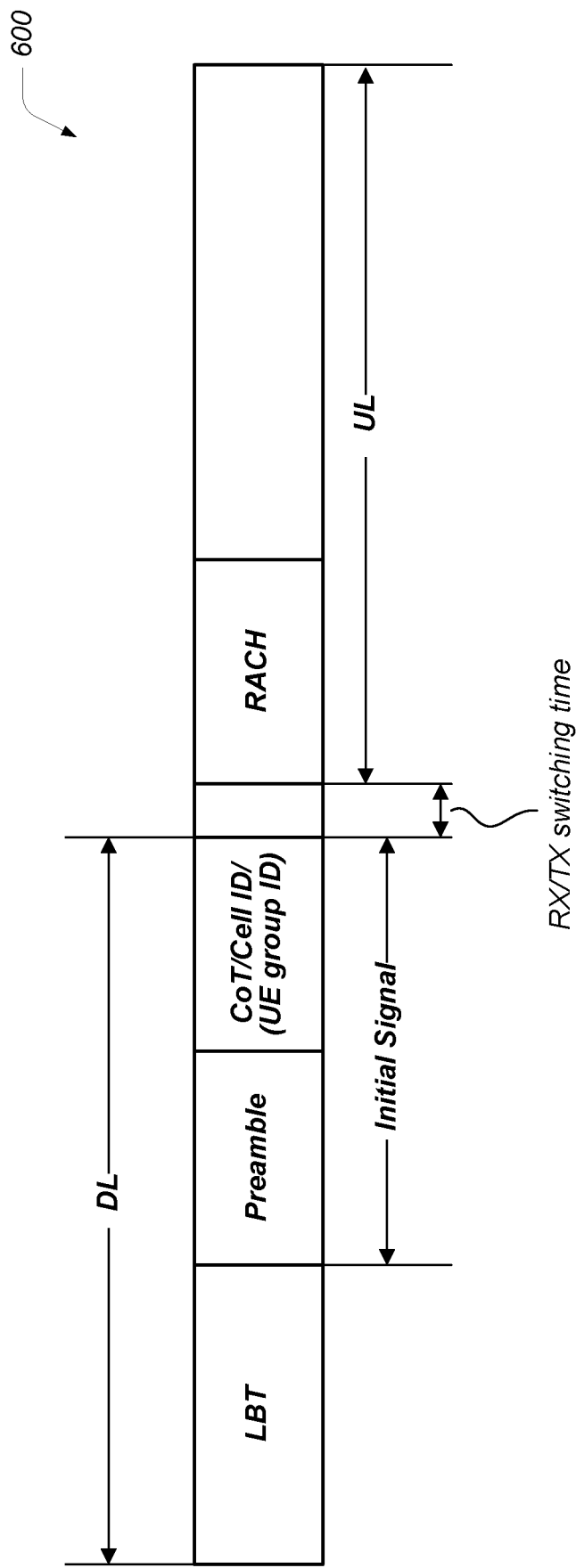
FIG. 6 illustrates an exemplary diagram of a signaling structure with an initial signal used to indicate resource reservation for a random access procedure, according to some embodiments.
Figure 7:
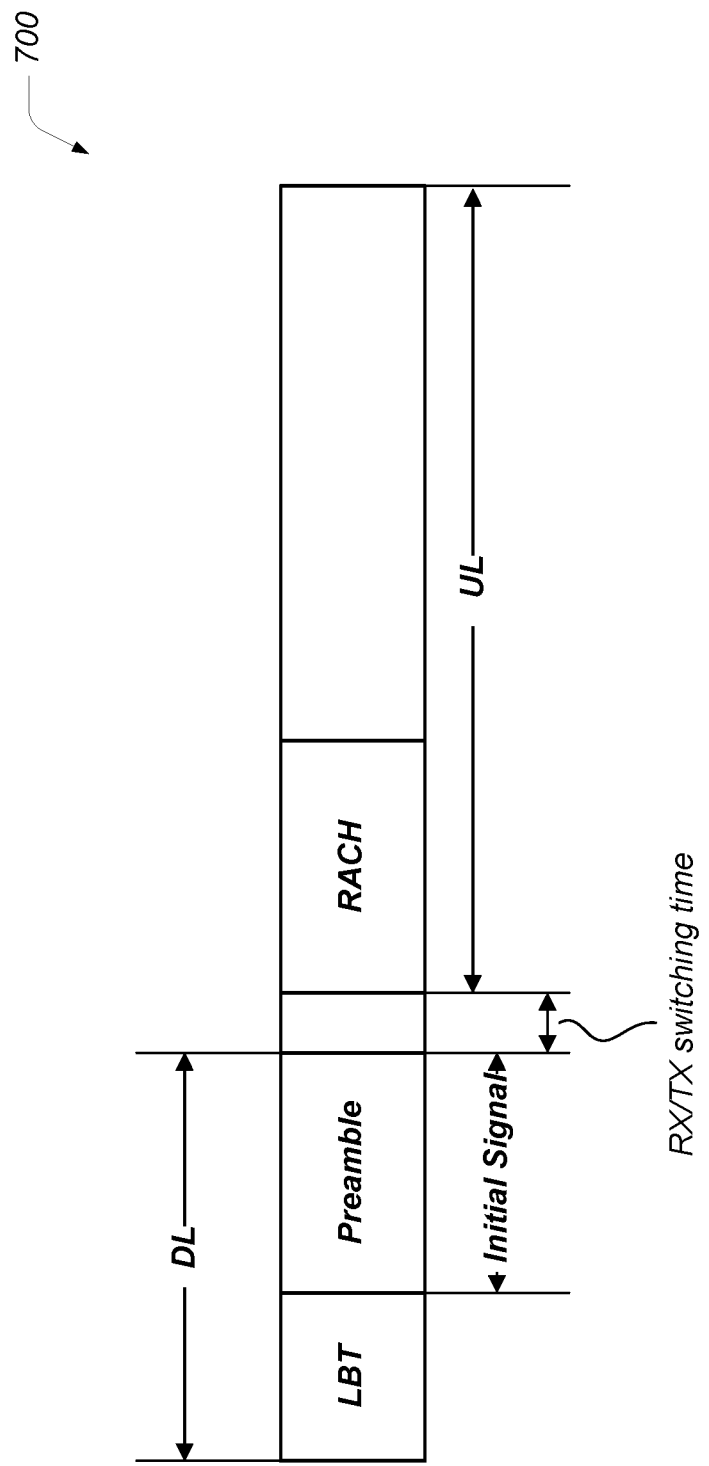
FIG. 7 illustrates an exemplary diagram of a signaling structure with an initial signal, in which the cell ID is carried in the preamble, used to indicate resource reservation for a random access procedure, according to some embodiments.

Reserving Network Resources for RACH—First Option—FIG. 6 and FIG. 7

In some embodiments, according to a first option, the network resources may be reserved by the network (e.g. by a gNB/base station serving the UE) using an "initial signal" to indicate the reservation to the UE. An exemplary timeline of how such a signal may be used for indicating the resource reservation for the UE for the purposes of a RACH is illustrated in timing diagram 600 of FIG. 6. The initial signal, spanning the shaded area as indicated, may carry information that includes:

- A preamble as a universal for NR-U to allow coherent detection;
- The CoT for indicating how long the channel will be occupied;
- A Cell ID indicating the cell that is to occupy the channel; and
- A UE group ID indicating the UE group to use the RACH resource that is to be reserved; that is, UEs belonging to the group indicated by the UE group ID are to use the reserved RACH resources.

As shown in FIG. 6, the initial signal may be transmitted following a successful LBT procedure performed by the network, and before the UE begins transmitting following the receive/transmit (RX/TX) switching time (the time that elapses between the UE ceasing reception and starting transmission; indicated by the shaded area as shown). The UE may perform the RACH subsequent to the RX/TX switching, according to the information/indication received from the network. E.g., the UE may perform the RACH based on the CoT, Cell ID and UE group ID information/indication received in the initial signal from the network.

FIG. 7 illustrates an alternative initial signaling scenario similar to but different than what is illustrated in FIG. 6. As illustrated in timeline 700 of FIG. 7, the Cell ID (and/or group ID) may be carried in the preamble, and the CoT for the RACH may be separately configured via RRC signaling (not explicitly indicated in FIG. 7). Therefore, the initial signal in this case may carry the preamble that includes the Cell ID, following the LBT procedure performed by the network, while the CoT for the RACH is configured via RRC signaling.

Figure 8:
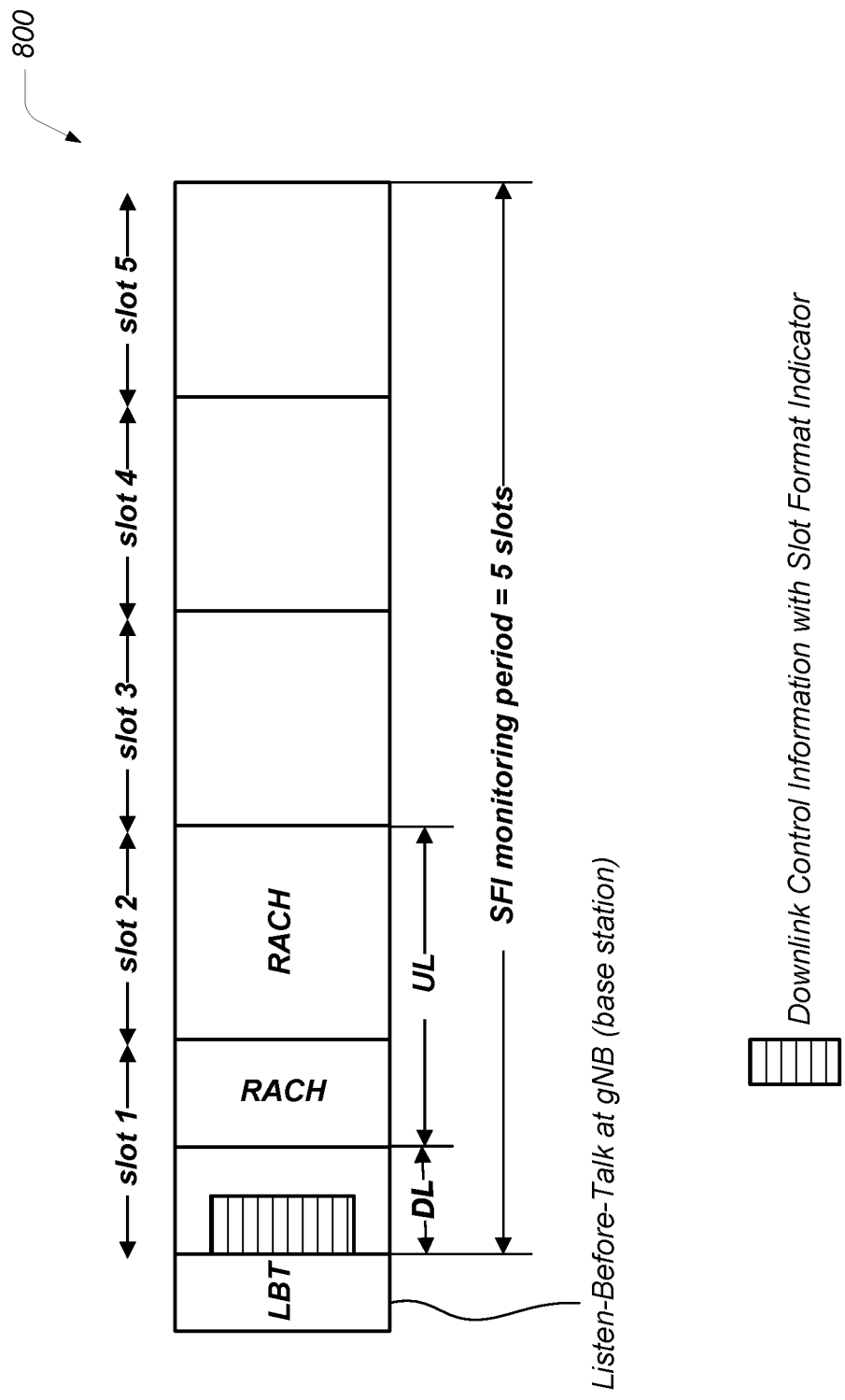
FIG. 8 illustrates an exemplary diagram of signaling structure in which a slot format indicator is used to indicate resource reservation for a random access procedure, according to some embodiments.

Reserving Network Resources for RACH—Second Option—FIG. 8

In some embodiments, a SFI (slot format indicator) may be used to indicate the reservation for RACH to the UE. It should be noted that in NR, a slot is defined as a fixed number (e.g. 14) of OFDM symbols. Accordingly, a higher subcarrier spacing may lead to a shorter slot duration. The CoT information may be represented by the slot pattern conveyed by the SFI. The SFI may be transmitted to the UE as part of downlink control information (DCI) as illustrated by timing diagram 800 in FIG. 8. For example, as shown in FIG. 8, the slot pattern for the first two slots following the LBT, i.e. for slot 1 and slot 2, may be "DDDDDDDD-UUUUUUU" for slot 1, and "UUUUUUUUUUUUUU" for slot 2, where "D" stands for downlink and "U" stands for uplink. In other words, in the first half of slot 1 downlink transmissions take place, while in the second half of slot 1 uplink transmissions take place. Slot 2 features exclusively uplink transmissions. Following a successful LBT procedure with the UE on the network, the CoT information may be transmitted to the UE via the slot pattern indicated by the SFI in the DCI transmitted to the UE during the DL portion of the first slot (slot 1) following the LBT procedure. The group UE ID may be indicated as the RNTI (Radio Network Temporary Identifier) in the SFI.

Figure 9:
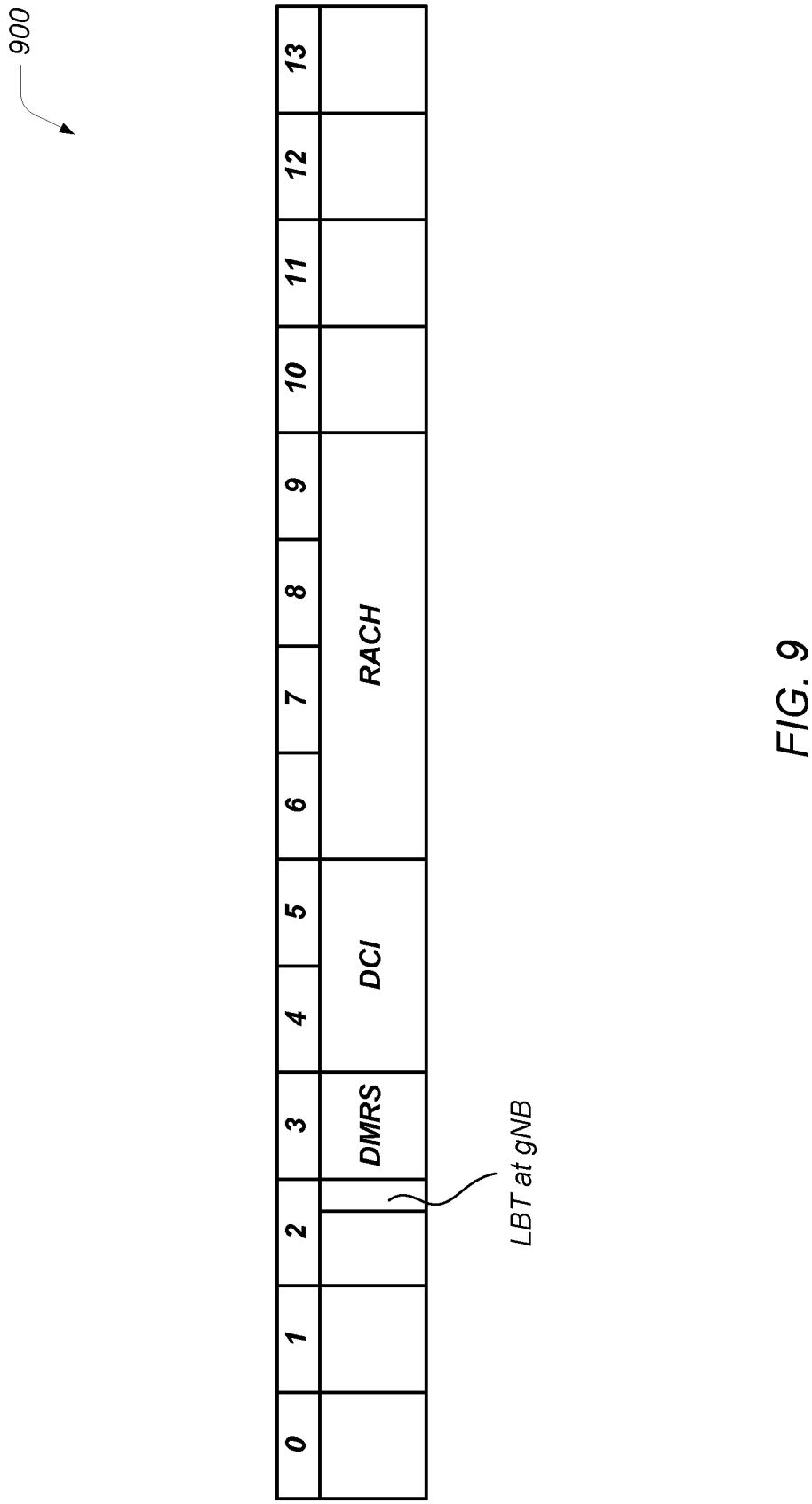
FIG. 9 illustrates an exemplary diagram of a signaling structure in which a wideband demodulation reference signal and downlink control information are used to indicate resource reservation for a random access procedure, according to some embodiments.

Reserving Network Resources for RACH—Third Option—FIG. 9

In some embodiments, a wideband Demodulation Reference Signal (DMRS) and Downlink Control Information (DCI) may be used to transmit (carry) information indicative of the reservation of network resources for the UE to perform a RACH, as illustrated in timing diagram 900 in FIG. 9. Both, wideband DMRS and RNTI of the PDCCH (Physical Downlink Control Channel) may carry the cell ID, while the DCI may carry information such as the CoT and group UE ID. Transmission of the DMRS and DCI may take place following the LBT procedure at the base station as illustrated in FIG. 9.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a device to:
wirelessly communicate on a network;
receive, through signaling from the network subsequent to a successful listen before talk (LBT) procedure by the network, information collectively transmitted in a wideband demodulation reference signal (DMRS) and in a physical downlink control channel (PDCCH) carrying downlink control information (DCI) that includes a slot format indicator (SFI), wherein the information indicates a reservation of specified random access channel (RACH) resources for the device, the SFI conveying a slot pattern by providing an indication of direction of individual symbols of a plurality of slots, wherein the slot pattern informs the device of a channel occupancy time (CoT) of the network, wherein the SFI comprises a radio network temporary identifier (RNTI) as an indicator of a device group of devices that are to use the specified RACH resources; and
perform a transmission to the network, using the specified RACH resources.

2. The apparatus of claim 1, wherein the information transmitted in the wideband DMRS includes cell identification that identifies a cell associated with the CoT of the network.

3. The apparatus of claim 1, wherein the processor is configured to cause the device to receive the DCI prior to a next uplink time period of the device.

4. The apparatus of claim 1, wherein the processor is configured to cause the device to receive resource information from the network in an initial signal transmitted prior to the wideband DMRS and the PDCHH, wherein the resource information indicates a reservation of specified resources for the device.

5. The apparatus of claim 4, wherein the initial signal includes a preamble that allows coherent detection by the device, wherein the preamble precedes the resource information within the initial signal.

6. The apparatus of claim 4, wherein the initial signal includes a preamble that allows coherent detection by the device, wherein the processing element is configured to further cause the device to receive additional resource information via additional signaling.

7. The apparatus of claim 6, wherein the additional signaling includes radio resource control signaling.

8. The apparatus of claim 1, wherein the RNTI carries cell identification that identifies a cell associated with the CoT of the network.

9. A device, comprising:
radio circuitry configured to facilitate wireless communications of the device; and
a processor communicatively coupled to the radio circuitry and configured to interoperate with the radio circuitry to:
wirelessly communicate on a network;
receive, through signaling from the network subsequent to a successful listen before talk (LBT) procedure by the network, information collectively transmitted in a wideband demodulation reference signal (DMRS) and in a physical downlink control channel (PDCCH) carrying downlink control information (DCI) that includes a slot format indicator (SFI), wherein the information indicates a reservation of specified random access channel (RACH) resources for the device, the SFI conveying a slot pattern by providing an indication of direction of individual symbols of a plurality of slots, wherein the slot pattern informs the device of a channel occupancy time (CoT) of the network, wherein the SFI comprises a radio network temporary identifier (RNTI) as an indicator of a device group of devices that are to use the specified RACH resources; and
perform a transmission to the network, using the specified RACH resources.

10. The device of claim 9, wherein the information transmitted in the wideband DMRS includes cell identification that identifies a cell associated with the CoT of the network.

11. The device of claim 9, wherein the processor is configured to further interoperate with the radio circuitry to receive resource information in an initial signal transmitted prior to the DMRS and the PDCCH;
wherein the resource information indicates a reservation of specified second RACH resources for the device.

12. The device of claim 11, wherein the initial signal includes a preamble that allows coherent detection by the device.

13. The device of claim 9, wherein the processor is configured to cause the device to receive the PDCCH prior to a next uplink time period of the device.

14. A non-transitory memory element storing instructions executable by a processor to cause a device to:
wirelessly communicate on a network;
receive, through signaling from the network subsequent to a successful listen before talk (LBT) procedure by the network, information collectively transmitted in a wideband demodulation reference signal (DMRS) and in a physical downlink control channel (PDCCH) carrying downlink control information (DCI) that includes a slot format indicator (SFI) for indicating a reservation of specified random access channel (RACH) resources for the device, the SFI conveying a slot pattern by providing an indication of direction of individual symbols of a plurality of slots, wherein the slot pattern informs the device of a channel occupancy time (CoT) of the network, wherein the SFI comprises a radio network temporary identifier (RNTI) as an indicator of a device group of devices that are to use the specified RACH resources; and
perform a transmission to the network, using the specified RACH resources.

15. The non-transitory memory element of claim 14, wherein the information transmitted in the wideband DMRS carries cell identification that identifies a cell associated with the CoT of the network.

16. The non-transitory memory element of claim 14, wherein the instructions are executable by the processor to cause the device to receive resource information in an initial signal transmitted prior to the DMRS and PDCCH;
wherein the resource information indicates a reservation of specified second RACH resources for the device.

17. The non-transitory memory element of claim 16, wherein the initial signal includes a preamble that allows coherent detection by the device, wherein the preamble precedes the resource information within the initial signal.

18. The non-transitory memory element of claim 14, wherein the instructions are executable by the processor to cause the device to receive the PDCCH prior to a next uplink time period of the device.

\* \* \* \* \*